(12) United States Patent
Kurian et al.

(10) Patent No.: US 8,972,438 B2
(45) Date of Patent: Mar. 3, 2015

(54) DATABASE ACCESS FOR NATIVE APPLICATIONS IN A VIRTUALIZED ENVIRONMENT

(75) Inventors: John Kurian, Bangalore (IN); Ajay Sood, Bangalore (IN); Hariharan N. Venkitachalam, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 12/961,221

(22) Filed: Dec. 6, 2010

(65) Prior Publication Data

US 2012/0144388 A1 Jun. 7, 2012

(51) Int. Cl.
*G06F 17/30* (2006.01)
*G06F 9/455* (2006.01)

(52) U.S. Cl.
CPC ........ *G06F 9/45504* (2013.01); *G06F 17/3041* (2013.01)
USPC ........................................................ 707/769

(58) Field of Classification Search
CPC .................... G06F 17/30424; G06F 17/30477; G06F 17/30442; G06F 17/30528
See application file for complete search history.

(56) References Cited

U.S. PATENT DOCUMENTS

| | | | |
|---|---|---|---|
| 6,314,430 B1 | 11/2001 | Chang | |
| 7,415,704 B2 | 8/2008 | Schmidt et al. | |
| 7,552,433 B2 | 6/2009 | Brothers | |
| 2003/0014552 A1 | 1/2003 | Vaitheeswaran et al. | |
| 2004/0268314 A1 | 12/2004 | Kollman et al. | |
| 2005/0044197 A1* | 2/2005 | Lai | 709/223 |
| 2005/0050040 A1* | 3/2005 | Theobald et al. | 707/4 |
| 2005/0050071 A1* | 3/2005 | Debrunner | 707/100 |
| 2006/0143290 A1* | 6/2006 | Dostert et al. | 709/224 |
| 2007/0136311 A1 | 6/2007 | Kasten et al. | |
| 2007/0233637 A1* | 10/2007 | Corvinelli et al. | 707/2 |
| 2008/0028401 A1* | 1/2008 | Geisinger | 718/1 |
| 2011/0023055 A1* | 1/2011 | Thatte et al. | 719/328 |

FOREIGN PATENT DOCUMENTS

WO 0077686 A2 12/2000

OTHER PUBLICATIONS

Yang et al., "Developing Integrated Web and Database Applications Using JAVA Applets and JDBC Drivers", 1998, SIGCSE '98 Proceeding of the twenty-ninth SIGCSE technical symposium on Computer science education, pp. 302-306.*

Goetz, Brian, "Threading lighting, Part 3: Sometimes it's Best not to Share," Oct. 16, 2001 (available online at http://www.ibm.com/developerworks/java/library/j-threads3.html, Retrieved on Nov. 11, 2010).

* cited by examiner

*Primary Examiner* — Rehana Perveen
*Assistant Examiner* — Alexander Khong
(74) *Attorney, Agent, or Firm* — Brevetto Law Group (57) ABSTRACT

A database may be accessed by creating a virtualized environment on a computer system and instantiating a driver for a database within the virtualized environment. A first execution thread within the virtualized environment is created and a first unique identifier is associated with the first execution thread within the driver for the database. A first connection to the database is then opened from within the first execution thread using the first unique identifier. A first native program containing embedded structured query language (SQL) statements is executed within the first execution thread and the first native program is provided with access to said database using the first connection to said database.

20 Claims, 4 Drawing Sheets

```
        //Attempt to create a database connection
302     String url = "jdbc.odbc." + args[0];

// The following statement informs the JDBC driver that the
        // connection has to be made in thread context and
        // assigns a unique connection identifier
306     DriverManager.setThreadConnectionContext("unique_ID");

// Open the database connection
308A    Connection firstConn =
308B            DriverManager.getConnection(url,"dba","sql","unique_ID");

//Invoke COBOL program
310     CobolRTS.callCobol("DBSEL.ibmcob",data_buffer);

//Commit the changes
312     firstConn.commit()
```

FIG. 3

```
        IDENTIFICATION DIVISION.
        ...
        LINKAGE SECTION.
        01    DATA-AREA.
              05 DATA-BUFFER    PIC X(33)
        PROCEDURE DIVISION
                  USING DATA-AREA
        ...                              ← 401
408     EXEC SQL SELECT EMPNAME
409          FROM EMPLOYEE
410          WHERE EMPID = '12345'
411     END-EXEC.
        ...
412     GOBACK.
```

DATABASE ACCESS FOR NATIVE APPLICATIONS IN A VIRTUALIZED ENVIRONMENT

BACKGROUND

1. Field of the Invention

The present subject matter relates to running native computer programs in a virtualized environment on a computer system, and more specifically, to allow the native application to access a database in the virtualized environment.

2. Description of Related Art

Many computer programs (sometimes called applications) used by businesses are written in legacy computer languages such as COBOL, FORTRAN, PL/1 or other older computer languages. In many cases, those applications were written many years ago, but since they adequately fulfill a business need, they have not been replaced or re-written in a different, more modern, computer language.

Computer systems continue to evolve over time, with changes to both hardware and software. A modern computer may be hundreds of times more powerful than a computer of 20 years ago costing the same amount. The system software running on computer systems has also evolved. In the early days of computers, a program may have run directly on the computer, but operating systems appeared that could provide certain services to programs, such as control of input/output devices and file systems. Operating systems also began to allow for multiple programs to run on a single computer, appearing to run them "simultaneously."

The Java software platform provides a variety of capabilities for computer systems including a virtualized environment for running applications through the Java Virtual Machine (JVM). A JVM has the capability to execute programs that have been compiled to a standardized intermediate format called Java bytecode programs. One way of creating Java bytecode programs is by using the Java programming language and compiling that into Java bytecode. The JVM has a just-in-time compiler that translates the Java bytecode into native processor instructions at run-time and caches the native code in memory during execution.

SUMMARY

Various embodiments of a method for accessing a database include creating a virtualized environment on a computer system and instantiating a driver for a database within the virtualized environment. A first execution thread within the virtualized environment is created and a first unique identifier is associated with the first execution thread within the driver for the database. A first connection to the database is then opened from within the first execution thread using the first unique identifier. A first native program containing embedded structured query language (SQL) statements is executed within the first execution thread and the first native program is provided with access to said database using the first connection to said database.

In some embodiments, a second execution thread is also created within the virtualized environment and a second unique identifier is associated with the second execution thread within the driver for the database. A second connection to the database is then opened from within the second execution thread using the second unique identifier. A second native program containing embedded structured query language (SQL) statements is executed within the second execution thread and the second native program is provided with access to said database using the second connection to said database.

Other embodiments include computer program products and computer systems implementing the methods described above.

BRIEF DESCRIPTION OF THE SEVERAL VIEWS OF THE DRAWINGS

The accompanying drawings, which are incorporated in and constitute part of the specification, illustrate various embodiments of the invention. Together with the general description, the drawings serve to explain the principles of the various embodiments. In the drawings.

DETAILED DESCRIPTION

In the following detailed description, numerous specific details are set forth by way of examples in order to provide a thorough understanding of various embodiments. However, it should be apparent to those skilled in the art that the embodiments of the present disclosure may be practiced without such details. In other cases, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Applications written in a computer programming language that is typically compiled to natively execute on computer under the control of an operating system may be called a native application. Native applications may be written in such languages as COBOL, FORTRAN, PL/1, or other programming languages. These native applications may include embedded structured query language (SQL) statements to access a database. It may be desirable to continue to utilize one or more of these native applications on a more modern computer system. As such, the native applications these may have to be re-hosted within a Java/J2EE (Java Platform Enterprise Edition) application server based upon multi-threaded Java Virtual Machine (JVM) environment, such as the WebSphere application server (WAS), the JBoss application server (JBoss AS), the Weblogic application server or other application servers. A Java based application server may provide a variety of libraries and drivers for applications to use. One such driver is a driver for Java Database Connectivity (JDBC) supporting the JDBC application programming interface (API).

A JVM may have multiple execution threads (or simply threads) running Java applications using the JDBC API. Java applications using the JDBC API may be able to open a connection to a database using a unique handle to identify the connection and the database queries from the Java application can specifically use the handle so that the proper database connection can be used. Native applications with embedded SQL statements may be invoked from the Java application using, for example, the Java Native Interface (JNI) within the same JVM thread, and it is desirable to be able to use the native applications without making any changes to the native application code. So to meet this objective, the embedded SQL statements within the native application may linked to the JDBC API.

Because the native applications are not specifically written to utilize the JDBC API, they may not have the ability to identify a specific database connection. In current systems, the default connection handle may be maintained in the JVM's process heap. The default connection handle used is the one set up by the first database connect call made within the JVM and stored in the process heap. Database queries made through JDBC that do not specify a database connection are routed to the default connection, so even separate instances (or instantiations) of native applications running in different JVM threads may then be using a common database connection. This may cause errors or other improper operation in the native applications or even corruption of the database data.

Reference now is made in detail to the examples illustrated in the accompanying drawings and discussed below.

Figure 1:
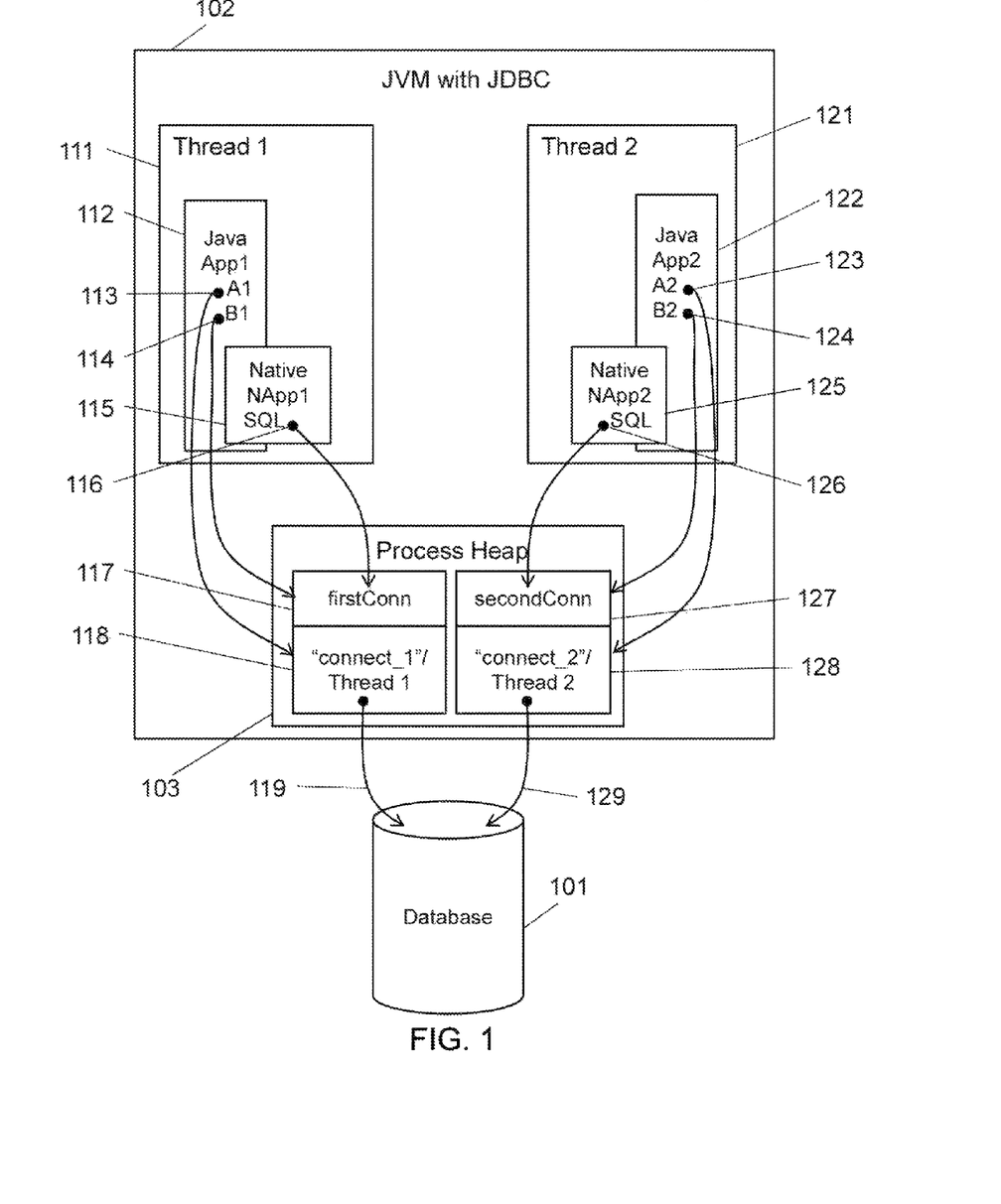
FIG. 1 shows a block diagram of an embodiment for providing database access to native applications running in a virtualized environment.

FIG. 1 shows a block diagram 100 of an embodiment for providing database access to native applications running in a virtualized environment. A Java Virtual Machine environment (JVM) 102 may be running on a computer system. A JDBC driver may be running within the JVM. A database 101 may be running on the same computer system or another computer system that is in communication with the JDBC driver running in the JVM. Any database may be used including, but not limited to, MySQL, IBM's DB2, Oracle's RDBMS, Microsoft's SQL server, or other relational or non-relational databases. In some embodiments, the JDBC driver may support open database connectivity (ODBC), but in other embodiments, a native interface to the database may be supported. A first Java application (App1) 112 may be running within the context of a first execution thread 111. A second Java application (App2) 122 may be running within the context of a second execution thread 121. App1 112 and App2 122 may be separate instantiations of the same application or may be different applications, but each application may have the need to invoke a native application. Java code 300 shown in FIG. 3 may be an example of some of the computer code that may be included in App1 112 and/or App2 122. App1 112 may invoke native application1 (NApp1) 115 and App2 122 may execute invoke native application2 (NApp2) 125. The native applications, NApp1 115 and NApp2 125 may utilize embedded structured query language (SQL) commands and may be separate instantiations of the same native application or may be different native applications. COBOL code 400 shown in FIG. 4 may be an example of some of the computer code that may be included in NApp1 115 and/or NApp2 125.

Code A1 113 within the Java application App1 112 may associate a unique identifier, "connect_1" 118 with the first execution thread 111. An example of code A1 113 may be line 306 of Java code 300 shown in FIG. 3. The association may be maintained with the process heap 103 of the JVM. Once the association has been created, code B1 114 within App1 112 may open a new connection 119 to the database 101 using a handle, "firstConn" 117 and identifying that it should be associated with the unique identifier "connect_1" 118. An example of code B1 114 may be lines 308A/B of Java code 300 shown in FIG. 3. The native application NApp1 115 may then be executed by App1 112. NApp1 115 may include embedded SQL commands 116 that access the database 101.

Figure 4:
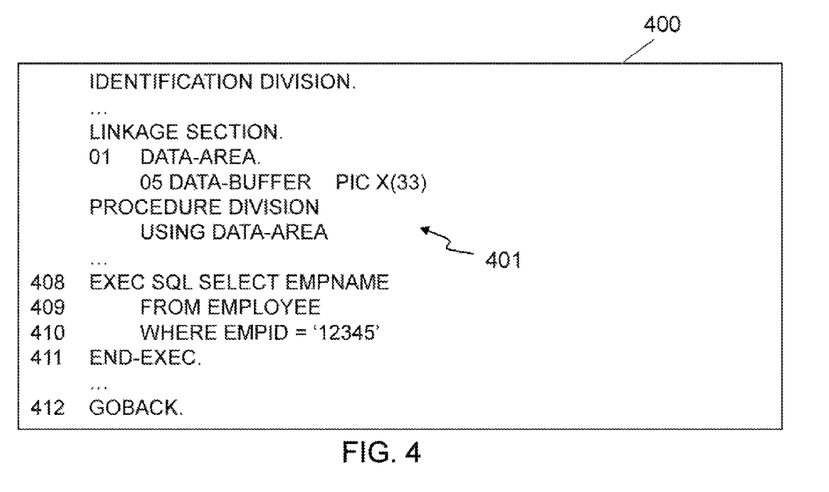
FIG. 4 is an example COBOL code fragment that may be useful for various embodiments.

Examples of embedded SQL commands 116 that may be used in NApp1 115 are lines 408-411 of COBOL code 400 shown in FIG. 4. The JDBC driver may recognize the database access from the embedded SQL commands 116 as using the default database connection for that particular thread 111. The JDBC driver may access the data stored in the process heap 103 to identify that the default database connection for that thread 111 is the database connection 119 with handle "firstConn" 117. So the embedded SQL commands 116 within NApp1 115 uses database connection 119.

Similarly, Code A2 123 within the Java application App2 122 may associate a unique identifier, "connect_2" 128 with the second execution thread 121. The association may be maintained with the process heap 103 of the JVM. Once the association has been created, code B2 124 within App2 122 may open a new connection 129 to the database 101 using a handle, "secondConn" 127 and identifying that it should be associated with the unique identifier "connect_2" 128. The native application NApp2 125 may then be executed by App2 122. NApp2 125 may include embedded SQL commands 126 that access the database 101. The JDBC driver may recognize the database access from the embedded SQL commands 126 as using the default database connection for that particular thread 121. The JDBC driver may access the data stored in the process heap 103 to identify that the default database connection for that thread 121 is the database connection 129 with handle "secondConn" 127. So the embedded SQL commands 126 within NApp2 125 uses database connection 129.

Although the block diagram 100 shows a JVM 102 and Java applications 112, 122 running in execution threads 111, 121 other virtual environments and/or programming languages may be used in other embodiments. Other virtual environments that may be used in alternative embodiments include, but are not limited to, Microsoft's Common Language Runtime (CLR), low level virtual machine (LLVM), Google's Dalvik, or others. Other programming languages that may be used in other embodiments include, but are not limited to, C, C+, C++, C#, Ruby, Python, or others.

Figure 2:
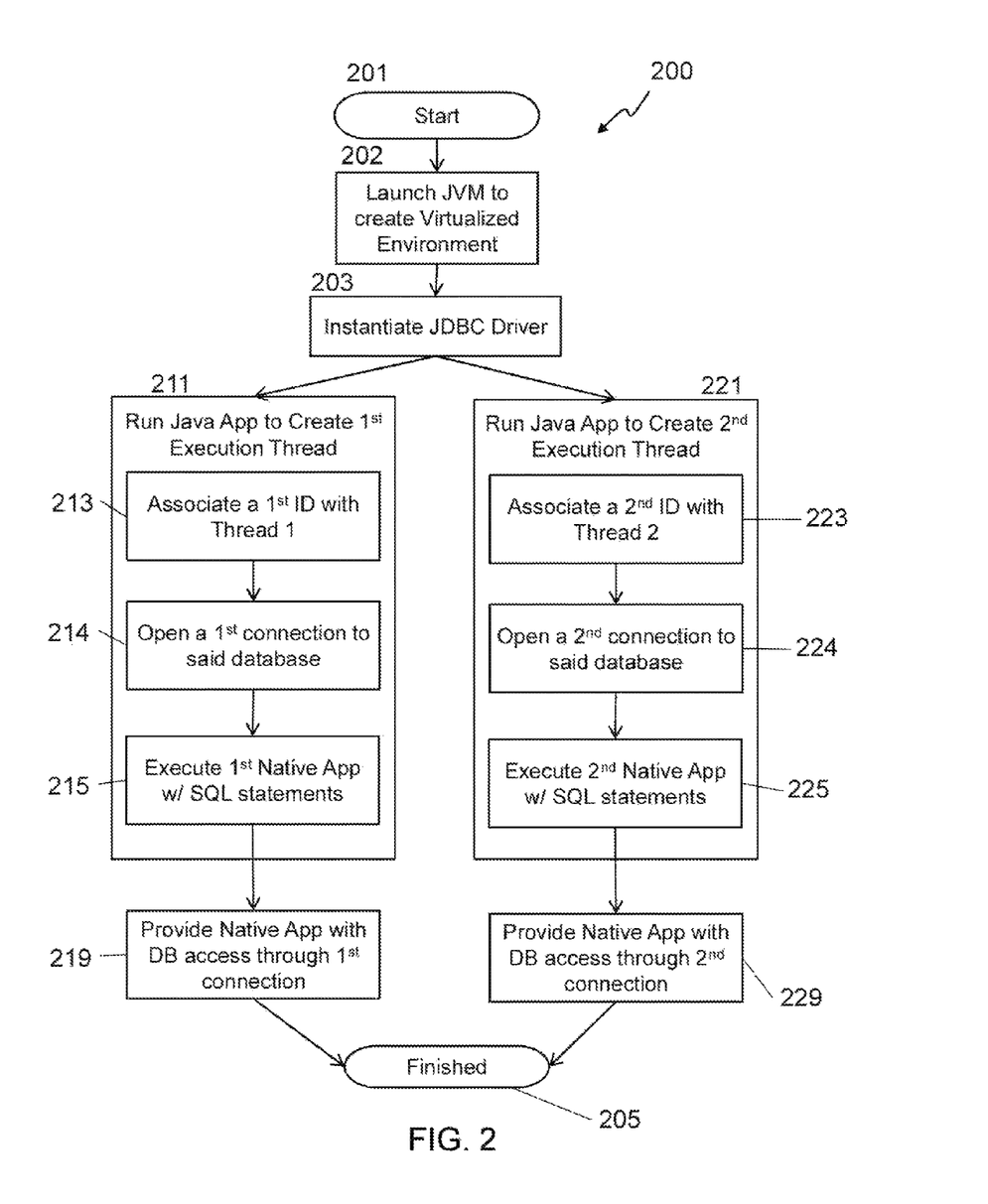
FIG. 2 shows a flow chart of an embodiment.

FIG. 2 shows a flow chart 200 of an embodiment consistent with the block diagram 100 of FIG. 1. A computer system may start up at block 201 and launch a JVM 102 at block 202 to create a virtualized environment for implementing an application server. A JDBC driver may be instantiated (or an instance created) at block 203. One or more threads may be created in the JVM 102. Flow chart 200 shows two execution threads being created at blocks 211 and 221.

The first execution thread 111 may be created at block 211 to run the first Java application 112. The Java application 112 may associate a first unique identifier 118 with the first thread 111 at block 213. The unique identifier 18 may be assigned by the Java application 112, the JDBC driver, or the JVM itself. The Java application 112 may open a first connection 119 to the database at block 214 and execute the first native application 115 at block 215. The first native application 115 includes embedded SQL statements 116 that access the database 101. When the native application 115 executes an SQL statement 116, the JDBC driver will identify that the current thread 111 needs to use the connection 119 that was created for the thread 111, so the native application 115 is provided database access through the first connection 119 to the database 101 at block 219.

The second execution thread 121 may be created at block 221 to run the second Java application 122. The Java application 122 may associate a second unique identifier 128 with the second thread 121 at block 223. The unique identifier may be assigned by the Java application 122, the JDBC driver, or the JVM itself. The Java application 122 may open a second connection 129 to the database at block 224 and execute the second native application 125 at block 225. The second native application 125 includes embedded SQL statements 126 that access the database 101. When the native application 125 executes an SQL statement 126, the JDBC driver will identify that the current thread 121 needs to use the connection 129 that was created for the thread 121, so the native application 125 is provided database access through the second connection 129 to the database 101 at block 229. Each Java application 112,121 may finish at block 205.

Figure 3:
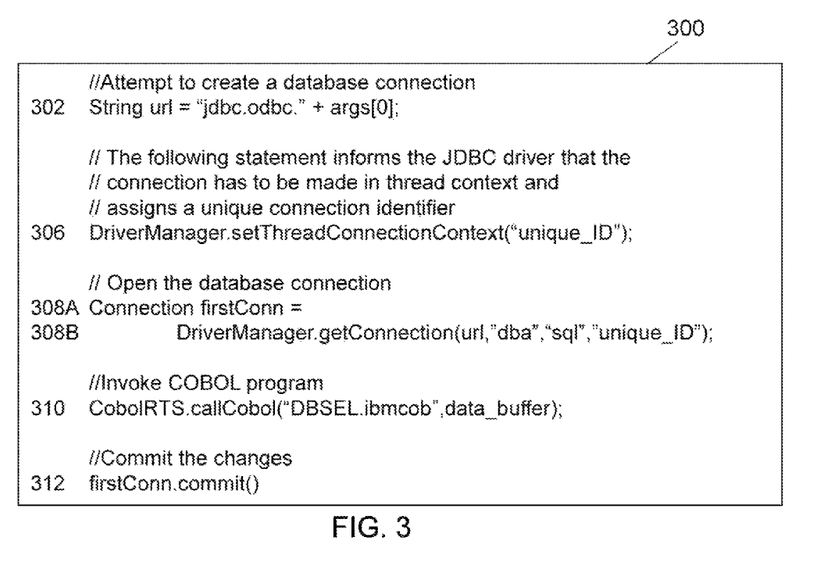
FIG. 3 is a Java code fragment useful for various embodiments.

FIG. 3 is a Java code fragment 300 useful for various embodiments. The code fragment 300 may be a part of the first and/or second Java Application 112, 122. Line 302 provides the particular JDBC driver to be used. Line 306 provides the association between the thread from which the code is executing and a unique identifier ("unique_ID" in the example shown). This step ensures that connection context is in the thread scope. The association may be maintained in a process heap of the JVM. Lines 308A and 308B open a connection to the database using the unique identifier "unique_ID" so that the JDBC driver knows to use the connection associated with the unique identifier for subsequent database accesses from that thread. Line 310 invokes an instantiation of the COBOL program DBSEL.ibmcob. After the COBOL program has finished, the Java application commits the changes made to the database at line 312.

FIG. 4 is an example COBOL code fragment 400 that may be useful for various embodiments. The COBOL code performs some initialization, and may perform other tasks as well, in the first part of the code 401. Lines 408-411 are embedded SQL statements. Line 408 identifies the field to retrieve, from the record type identified in line 409 with the characteristic described in line 410. The embedded SQL statement ends at line 411. The COBOL program may perform other tasks before ending at line 412. Note that there is nothing unique to the JVM environment in the COBOL code fragment.

Figure 5:
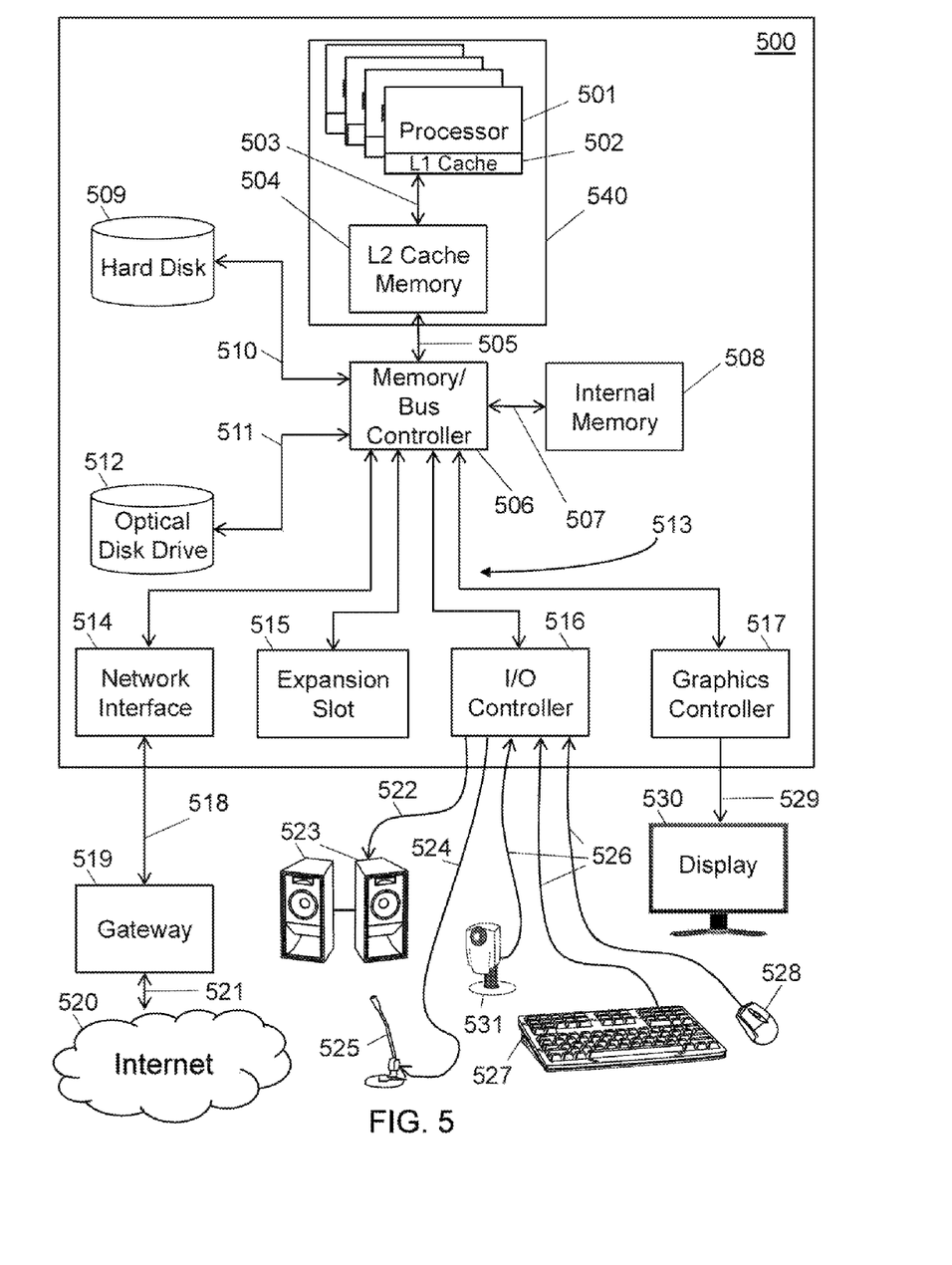
FIG. 5 depicts details of a computer system suitable for implementing various embodiments.

FIG. 5 depicts details of a computer system 500 suitable for implementing various embodiments. The computer system 500 may be configured in the form of a desktop computer, a laptop computer, a mainframe computer, or any other hardware or logic arrangement capable of being programmed or configured to carry out instructions. In some embodiments the computer system 500 may act as a server, accepting inputs from a remote user over a local area network (LAN) 518 or the internet 520. In other embodiments, the computer system 500 may function as a smart user interface device for a server on a LAN 518 or over the internet 520. The computer system 500 may be located and interconnected in one location, or may be distributed in various locations and interconnected via communication links such as a LAN 518 or a wide area network (WAN), via the Internet 520, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. One skilled in the art may recognize that many different architectures may be suitable for the computer system 500, but only one typical architecture is depicted in FIG. 5.

Computer system 500 may include a processor 501 which may be embodied as a microprocessor, two or more parallel processors as shown in FIG. 5, a central processing unit (CPU) or other such control logic or circuitry. The processor 501 may be configured to access a local cache memory 502, and send requests for data that are not found in the local cache memory 502 across a cache bus 503 to a second level cache memory 504. Some embodiments may integrate the processor 501, and the local cache 502 onto a single integrated circuit and other embodiments may utilize a single level cache memory or no cache memory at all. Other embodiments may integrate multiple processors 501 onto a single die and/or into a single package. Yet other embodiments may integrate multiple processors 501 with multiple local cache memories 502 with a second level cache memory 504 into a single package 540 with a front side bus 505 to communicate to a memory/bus controller 506. The memory/bus controller 506 may accept accesses from the processor(s) 501 and direct them to either the internal memory 508 or to the various input/output (I/O) busses 510, 511, 513. Some embodiments of the computer system 500 may include multiple processor packages 540 sharing the front-side bus 505 to the memory/bus controller 506. Other embodiments may have multiple processor packages 540 with independent front-side bus connections to the memory/bus controller 506. The memory bus controller 506 may communicate with the internal memory 508 using a memory bus 507. The internal memory 508 may include one or more of random access memory (RAM) devices such as synchronous dynamic random access memories (SDRAM), double data rate (DDR) memories, or other volatile random access memories. The internal memory 508 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 500 may also include 3rd level cache memory or a combination of these or other like types of circuitry configured to store information in a retrievable format. In some implementations the internal memory 508 may be configured as part of the processor 501, or alternatively, may be configured separate from it but within the same package 540. The processor 501 may be able to access internal memory 508 via a different bus or control lines than is used to access the other components of computer system 500.

The computer system 500 may also include, or have access to, one or more hard drives 509 (or other types of storage memory) and optical disk drives 512. Hard drives 509 and the optical disks for optical disk drives 512, along with memory 508, are examples of machine readable (also called computer readable) mediums suitable for storing computer program products as well as the final or interim results of the various embodiments. The optical disk drives 512 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 500 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable storage medium. The computer system 500 may either include the hard drives 509 and optical disk drives 512 as an integral part of the computer system 500 (e.g., within the same cabinet or enclosure and/or using the same power supply), as connected peripherals, or may access the hard drives 509 and optical disk drives 512 over a network, or a combination of these. The hard drive 509 often includes a rotating magnetic medium configured for the storage and retrieval of data, computer programs or other information. In some embodiments, the hard drive 509 may be a solid state drive using semiconductor memories. In other embodiments, some other type of computer useable medium may be used. The hard drive 509 need not necessarily be contained within the computer system 500. For example, in some embodiments the hard drive 509 may be server storage space within a network that is accessible to the computer system 500 for the storage and retrieval of data, computer programs or other information. In some embodiments the computer system 500 may use storage space at a server storage farm, or like type of storage facility, that is accessible by the Internet 520 or other communications lines. The hard drive 509 is often used to store the software, instructions and programs executed by the computer system 500, including for example, all or parts of the computer application program for carrying out activities of the various embodiments.

Communication links 510, 511 may be used to access the contents of the hard drives 509 and optical disk drives 512. The communication links 510, 511 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller 506 may also provide other I/O communication links 513. In some embodiments, the links 513 may be a shared bus architecture such as peripheral component interface (PCI), microchannel, industry standard architecture (ISA) bus, extended industry standard architecture (EISA) bus, VERSAmodule Eurocard (VME) bus, or any other shared computer bus. In other embodiments, the links 513 may be point-to-point links such as PCI-Express, HyperTransport, or any other point-to-point I/O link. Various I/O devices may be configured as a part of the computer system 500. In many embodiments, a network interface 514 may be included to allow the computer system 500 to connect to a network 518. The network 518 may be an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 519 or router, which may be a separate component from the computer system 500 or may be included as an integral part of the computer system 500, may be connected to the network 518 to allow the computer system 500 to communicate with the internet 520 over an internet connection 521 such as an asymmetric digital subscriber line (ADSL), data over cable service interface specification (DOCSIS) link, T1 or other internet connection mechanism. In other embodiments, the computer system 500 may have a direct connection to the internet 520. In some embodiments, an expansion slot 515 may be included to allow a user to add additional functionality to the computer system 500.

The computer system 500 may include an I/O controller 516 providing access to external communication interfaces such as universal serial bus (USB) connections 526, serial ports such as RS-232, parallel ports, audio in 524 and audio out 522 connections, the high performance serial bus IEEE-1394 and/or other communication links. These connections may also have separate circuitry in some embodiments, or may be connected through a bridge to another computer communication link provided by the I/O controller 516. A graphics controller 517 may also be provided to allow applications running on the processor 501 to display information to a user.

The graphics controller 517 may output video through a video port 529 that may utilize a standard or proprietary format such as an analog video graphic array (VGA) connection, a digital video interface (DVI), a digital high definition multimedia interface (HDMI) connection, or any other video connection. The video connection 529 may connect to display 530 to present the video information to the user. The dispcoupledlay 530 may be any of several types of displays, including a liquid crystal display (LCD), a cathode ray tube (CRT) monitor, on organic light emitting diode (OLED) array, or other type of display suitable for displaying information for the user. The display 530 may include one or more light emitting diode (LED) indicator lights, or other such display devices. Typically, the computer system 500 includes one or more user input/output (I/O) devices such as a keyboard 527, mouse 528, and/or other means of controlling the cursor represented including but not limited to a touchscreen, touchpad, joystick, trackball, tablet, or other device. The user I/O devices may connect to the computer system 500 using USB 526 interfaces or other connections such as RS-232, PS/2 connector or other interfaces. Some embodiments may include webcam 531 which may connect using USB 526, a microphone 525 connected to an audio input connection 524 and/or speakers 523 connected to an audio output connection 522. The keyboard 527 and mouse 528, speakers 523, microphone 525, webcam 531, and monitor 530 may be used in various combinations, or separately, as means for presenting information to the user and/or receiving information and other inputs from a user to be used in carrying out various programs and calculations. Speech recognition software may be used in conjunction with the microphone 525 to receive and interpret user speech commands.

The computer system 500 may be suitable for use in providing database access to native applications in a virtualized environment. For example, the processor 501 may be embodied as a microprocessor, microcontroller, DSP, RISC processor, two or more parallel processors, or any other type of processing unit that one of ordinary skill would recognize as being capable of performing or controlling the functions, activities and methods described herein. A processing unit in accordance with at least one of the various embodiments can operate computer software programs stored (embodied) on computer-readable medium such those compatible with the disk drives 509, the optical disk drive 512 or any other type of hard disk drive, floppy disk, flash memory, ram, or other computer readable medium as recognized by those of ordinary skill in the art.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more computer readable medium(s) may be utilized. The computer readable medium is typically a computer readable storage medium. A computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. As used herein, the term "coupled" includes direct and indirect connections. Moreover, where first and second devices are coupled, intervening devices including active devices may be located there between.

The corresponding structures, materials, acts, and equivalents of all means or step plus function elements in the claims below are intended to include any structure, material, or act for performing the function in combination with other claimed elements as specifically claimed. The description of the various embodiments has been presented for purposes of illustration and description, but is not intended to be exhaustive or to limit the invention to the forms disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A method for accessing a database comprising:
    creating a virtualized environment on a computer system;
    instantiating a driver for a database within said virtualized environment;
    running a first execution thread and a second execution thread within said virtualized environment;
    associating a first unique identifier with the first execution thread and a second unique identifier with the second execution thread for said database;
    opening a first connection to said database from within the first execution thread using the first unique identifier, and a second connection to said database from within the second execution thread using the second unique identifier;

executing a first native application containing embedded structured query language (SQL) statements within the first execution thread;

executing a second native application containing embedded structured query language (SQL) statements within the second execution thread;

providing the first native application with access to said database using the first connection to said database; and providing the second native application with access to said database using the second connection to said database;

wherein a first access of said database from the first native application uses the first connection to said database;

wherein a second access of said database from the second native application uses the second connection to said database;

wherein the first connection to said database and the second connection to said database have different contexts; and wherein the first native application comprises computer code compiled from a first language and the second native application comprises computer code compiled from a second language that differs from the first language.

2. The method of claim 1, wherein the virtualized environment is a Java Virtual Machine (JVM); and wherein the driver for said database supports a Java Database Connectivity (JDBC) application programming interface (API).

3. The method of claim 1, wherein the first unique identifier and the second unique identifier are assigned by the driver for said database.

4. The method of claim 1, wherein the first unique identifier is assigned from within the first execution thread and the second unique identifier is assigned from the second execution thread.

5. The method of claim 1, wherein the first native application comprises:

computer code compiled from a COBOL program, wherein the COBOL program has no modifications to support said virtualized environment.

6. A computer program product for accessing a database, the computer program product comprising:

a non-transitory computer readable storage medium having computer readable program code embodied therewith, the computer readable program code comprising:

computer readable program code configured to provide a virtualized environment on a computer system;

computer readable program code configured to provide a driver for a database within said virtualized environment;

computer readable program code configured to provide a first execution thread and a second execution thread within said virtualized environment;

computer readable program code configured to associate a first unique identifier with the first execution thread for said database;

computer readable program code configured to open a first connection to said database from within the first execution thread using the first unique identifier;

computer readable program code configured to execute a first native application containing embedded structured query language (SQL) statements within the first execution thread;

computer readable program code configured to provide the first native application with access to said database using the first connection to said database;

computer readable program code configured to associate a second unique identifier with the second execution thread for said database;

computer readable program code configured to open a second connection to said database from within the second execution thread using the second unique identifier;

computer readable program code configured to execute a second native application containing embedded structured query language (SQL) statements within the second execution thread; and computer readable program code configured to provide the second native application with access to said database using the second connection to said database;

wherein an access of said database from the first native application uses the first connection to said database;

wherein an access of said database from the second native application uses the second connection to said database;

wherein the first connection to said database and the second connection to said database have different contexts; and wherein the first native application comprises computer code compiled from a first language and the second native application comprises computer code compiled from a second language that differs from the first language.

7. A computer program product of claim 6, wherein the virtualized environment is a Java Virtual Machine (JVM); and wherein the driver for said database supports a Java Database Connectivity (JDBC) application programming interface (API).

8. A computer program product of claim 6, wherein the first unique identifier and the second unique identifier are assigned by the driver for said database.

9. A computer program product of claim 6, wherein the first unique identifier is assigned from within the first execution thread and the second unique identifier is assigned from the second execution thread.

10. A computer program product of claim 6, wherein the first native application comprises:

computer code compiled from a COBOL program, wherein said computer code compiled from the COBOL program is configured to run on the processor, and the COBOL program has no modifications to support said virtualized environment.

11. A computer system comprising:

a processor;

memory communicatively coupled to the processor; and the computer program product of claim 6; wherein the processor is configured to read the computer readable program code from the non-transitory computer readable storage medium; and the processor is capable of running at least a portion of the computer readable program code.

12. The computer system of claim 11, wherein the virtualized environment is a Java Virtual Machine (JVM) and the JVM is configured to run on the processor; and wherein the driver for said database supports a Java Database Connectivity (JDBC) application programming interface (API) and the driver is configured to run on the processor.

13. The computer system of claim 11, wherein the first native application comprises:

computer code compiled from a COBOL program, wherein said computer code compiled from the COBOL program is configured to run on the processor, and the COBOL program has no modifications to support said virtualized environment.

14. The method of claim 2, wherein the association of the first unique identifier to the first execution thread and the association of the second unique identifier to the second execution thread is maintained in a process heap of the JVM.

15. The method of claim 14, wherein a DriverManager.getConnection interface of the driver comprises an extension to identify a unique connection identifier.

16. The computer program product of claim 7, wherein the association of the first unique identifier to the first execution thread and the association of the second unique identifier to the second execution thread is maintained in a process heap of the JVM.

17. The computer program product of claim 16, wherein a DriverManager.getConnection interface of the driver comprises an extension to identify a unique connection identifier.

18. The method of claim 1, wherein the virtualized environment is a Java Virtual Machine (JVM) configured to execute programs that have been compiled into Java bytecode programs; and     wherein the first language is selected from a group consisting of COBOL, FORTRAN and PL/1.

19. A computer program product of claim 6, wherein the virtualized environment is a Java Virtual Machine (JVM) configured to execute programs that have been compiled into Java bytecode programs; and     wherein the first language is selected from a group consisting of COBOL, FORTRAN and PL/1.

20. The computer system of claim 11, wherein the virtualized environment is a Java Virtual Machine (JVM) configured to execute programs that have been compiled into Java bytecode programs; and     wherein the first language is selected from a group consisting of COBOL, FORTRAN and PL/1.

\* \* \* \* \*